Feb. 3, 1970     H. NOLTE     3,492,885

DRIVING CHAIN

Filed Aug. 4, 1967

Inventor:
HERMANN NOLTE
ATTORNEY

United States Patent Office 3,492,885
Patented Feb. 3, 1970

3,492,885
DRIVING CHAIN
Hermann Nolte, Borgholzhausen, Germany, assignor to Firma Heinrich Schomaker & Co., Altenmelle, Germany
Filed Aug. 4, 1967, Ser. No. 658,411
Claims priority, application Germany, Aug. 12, 1966, Sch 39,394
Int. Cl. F16g 13/02
U.S. Cl. 74—257                                            3 Claims

ABSTRACT OF THE DISCLOSURE

Driving chain comprising alternate pairs of inside and outside links adjacent pairs of which are hinged together by pin and bush assemblages has a flexible, dished sealing washer in a clearance between each adjacent pair of links along each side of the chain. The sealing washers form sealed lubricant reservoirs communicating with the bearing surfaces of the pin and bush assemblages.

---

Figure 1:
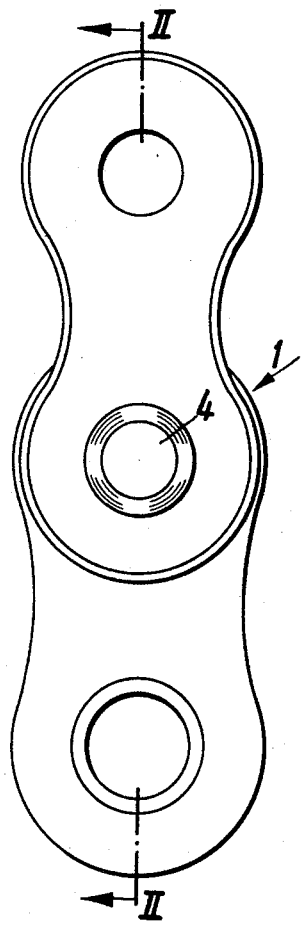

The invention relates to driving chain of the kind comprising links usually of steel intended to engage with toothed wheels to transmit power from one shaft to another. In such chain each pair of outside links is hinged to the adjacent pairs of inside links in the chain and to each such pair of inside links by a pin journalled in a bush carried by the links.

Chains of this kind are exposed to severe wear when used in adverse conditions, e.g. in mines, cement factories, continuous conveyors, building site machinery etc., and in particular as a consequence of exposure to dirt and water, and have a short working life because of the fact that maintenance during operation, in particular at the inaccessible journals of the chain where the most wear takes place, is generally out of the question.

In order to alleviate this situation, driving chains have already become known in which the link pins are journalled in lubricant charged sintered metal bushes. Chains of this type are, it is true substantially maintenance-free and have a longer than average operational life; however, they are more expensive and in particular, when compared with normal steel link chains, have substantially poorer properties in terms of bearing pressure. The same applies even more so to driving chains of another kind, in which the link pins are carried in sleeves of synthetic material.

It is, therefore, the aim of the present invention to provide a driving chain of the kind described in such a fashion that whilst maintaining the critical dimensions such as the cross-section, the diameter of link pins and bushes and in particular the usual values of bearing pressure between pin and bush, the chain is self-lubricating and has a long operational life.

The present invention provides an improvement in driving chain of the kind described comprising a flexible seal in a clearance between each adjacent pair of inside and outside links along each side of the chain, said seal forming an annular lubricant space which is sealed off from the exterior and which communicates with the bearing surfaces of the pin and bush assemblage hingeably connecting the adjacent links.

Preferably the seal is in the form of a dished washer having a central bore of a diameter corresponding to that of the pin of the pin and bush assemblage hingeably connecting the adjacent links associated with the seal, the pin being received in the bore of the washer and the washer having a peripheral lip lying in inwardly directed sealing engagement with the inside link associated with the seal.

Preferably also the seal is pre-loaded between the adjacent links associated therewith and the clearance between the links is smaller than the pre-load deflection of the seal. In this way, axial displacements between the inside and outside links associated with the seal can be compensated for without the sealing action becoming ineffective.

In order to reduce wear, the seal may be reinforced with metal washers.

By means of the invention, the bearing surfaces of the pin and bush assemblages are continuously lubricated without need for any maintenance in this direction, and the bearing surfaces are fully sealed off from the exterior; the annular clearance gap between each pin and bush is automatically supplied with lubricant from the communicating lubricant-filled annular spaces to each side of the gap whenever an axial movement compresses one or other of the flexible seals forming the spaces. In this fashion, in a simple and inexpensive manner, an ordinary driving chain can be given an operational life many times that which could normally be expected, and no longer requires any maintenance.

In the accompanying drawings, one embodiment of the invention has been illustrated and will now be described by way of example.

Figure 2:
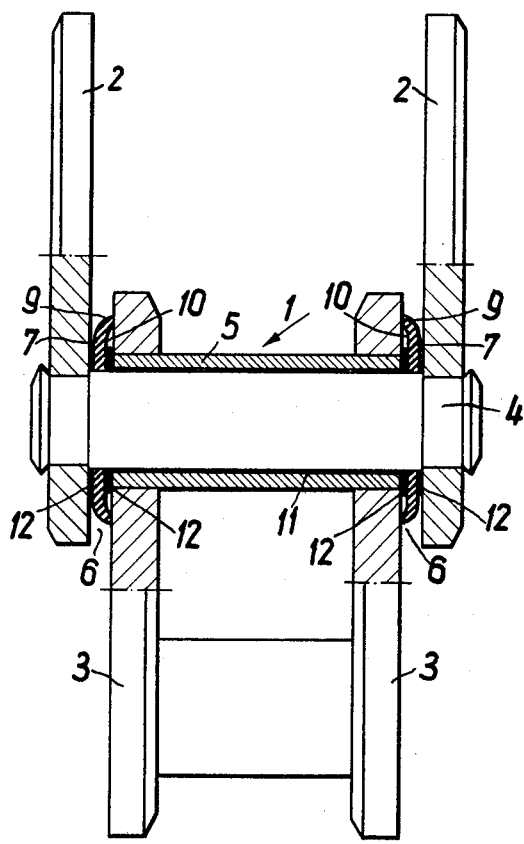
Figure 3:
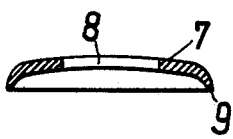

In the drawings:
FIG. 1 is a side elevation showing part of a driving chain according to the invention,
FIG. 2 is a section on the line 11—11 of FIG. 1,
FIG. 3 is a cross-section of a seal as used in the driving chain shown in FIGS. 1 and 2.

Referring to the drawings, the reference numeral 1 indicates one hinge joint of a steel link driving chain, comprising alternate pairs of inside and outside links 3, 3 and 2, 2 respectively, each pair of outside links 3, 3, being hinged to the adjacent pairs of inside links 2, 2 in the chain and to each such pair of inside links 2, 2 by a pin 4 journalled in a bush 5 press-fitted between the links 3. In a clearance 6 left between each pair of adjacent links 2, 3 along each side of the chain a flexible seal 7 in the form of a washer or synthetic material, preferably a polyamide based material such as nylon, is provided, the washer having a central bore 8 of a diameter corresponding to that of the associated pin 4 and being mounted on said pin in a firm sealed manner. As assembled the seal 7 is preloaded between the links 2, 3 and is so arranged in the clearance 6 that a face of the seal which is convex or externally arched in the unloaded condition of the seal as shown in FIG. 3 bears against the inside face of the outside link 2. The seal has a peripheral lip 9 lying in inwardly directed sealing engagement with the outside face of the outside link 3. In this way, inside the clearance 6 between the link 2 and the link 3, an annular space 10 is formed by the seal which is sealed off from the exterior and which communicates with the bearing surfaces of the pin and bush assemblage 4, 5, which together define an annular clearance 11 of normal size. This space is filled with a suitable lubricant such as "Molykote." The annular space 10 in this context serves as a reservoir for holding the initial, sole charge of lubricant, and with any relative axial displacement of the pin and bush assemblage in the sense to squash the seal, the preloaded seal 7 forces lubricant from this annular space 10 into the annular clearance 11 so that the pin 4 is continuously bathed in a film of lubricant inside the bush 5, and requires no maintenance, and consequently there is practically no wear in the moving parts of the joint.

The normal clearance 6 between each link 2 and its adjacent link 3 is not altered to any substantial extent by the inclusion of the seal 7. The clearance 6 is in all instances smaller than the preload travel of the seal 7 so that the peripheral lip 9 of the seal continues to bear against the sealing surface of the link 3 even when, due to the presence of the clearance 6 at the other side of the chain, the link 3 shifts away from the link 2 by the maximum possible amount. Such shift is limited by the seal 7 on the opposite end of the pin 4. The front and rear sides of each seal are conveniently strengthened or reinforced by means of a brass washer 12. The brass washers 12 also prevent premature wear of the seal since relative rotational movement occurs only between the link 2 and the outside washer 12.

I claim:

1. In a driving chain of the kind comprising alternate pairs of inside and outside links, each pair of outside links being hinged to the adjacent pairs of inside links in the chain with the hinged relationship between each pair of outside links and each such pair of inside links being provided with a pin journalled in a bush carried by the inside links, a flexible dish-shaped seal in a clearance between each adjacent pair of inside and outside links along each side of the chain, said seal forming an annular lubricant space which is sealed off from the exterior and which communicates with the bearing surfaces of the pin and bush assemblage hingedly connecting the adjacent links, the improvement comprising a preloading of the seal between the adjacent links associated therewith, the maximum possible amount of axial shift of an inside link away from an adjacent outside link being smaller than the preload deflection of the seal and whereby said shift provides a pumping action for lubricant from storage within one seal, through an associated pin-bush hinge, into the opposing, unloaded seal.

2. Driving chain as claimed in claim 1, wherein the seal is in the form of a plastic washer having a central bore of a diameter corresponding to that of said pin, the pin being received in the bore of the washer and the washer having a peripheral lip lying in inwardly directed sealing engagement with the inside link associated with the seal.

3. Driving chain as claimed in claim 2, wherein metal washers are arranged on the seal about said pin, one on its side facing its adjacent inside link and one on its side facing its adjacent outside link.

References Cited

UNITED STATES PATENTS 2,336,913 12/1943 Albrecht _____ 74—257
2,622,449 12/1952 Barker _____ 74—257
3,068,712 12/1962 Kuntzmann _____ 74—255
3,336,089 8/1967 Krickler _____ 74—257 XR FRED C. MATTERN, Jr., Primary Examiner JAMES A. WONG, Assistant Examiner